United States Patent [19]

Sumihi

[11] Patent Number: 4,730,505
[45] Date of Patent: * Mar. 15, 1988

[54] POWER CHANGE-OVER MECHANISM OF A VEHICLE FOR INDUSTRIAL MACHINERY

[75] Inventor: Noritaka Sumihi, Neyagawa, Japan

[73] Assignee: Kabushiki Kaisha Daikin Seisakusho, Osaka, Japan

[ * ] Notice: The portion of the term of this patent subsequent to Nov. 19, 2002 has been disclaimed.

[21] Appl. No.: 937,789

[22] Filed: Dec. 4, 1986

Related U.S. Application Data

[62] Division of Ser. No. 714,749, Mar. 22, 1985, Pat. No. 4,677,867.

[30] Foreign Application Priority Data

Mar. 23, 1984 [JP] Japan ............................ 59-42622[U]

[51] Int. Cl.$^4$ ............................................. F16H 3/08
[52] U.S. Cl. ........................................ 74/332; 74/333; 192/48.91
[58] Field of Search ................ 74/332, 333, 330, 356, 74/370, 665 F, 665 T; 192/48.91, 30 V, 67 V, 67 A, 49; 180/233, 247

[56] References Cited

U.S. PATENT DOCUMENTS

| | | | |
|---|---|---|---|
| 2,327,063 | 8/1943 | Randol | 74/333 X |
| 2,429,789 | 10/1947 | Bachman et al. | 74/333 X |
| 2,543,385 | 2/1951 | Tarlton | 74/333 |
| 2,971,595 | 2/1961 | Faberé et al. | 180/247 |
| 3,088,336 | 5/1963 | Fodrea | 74/333 |
| 4,270,409 | 6/1981 | Glaze et al. | 180/247 |
| 4,292,860 | 10/1981 | Kako et al. | 180/247 |
| 4,452,094 | 6/1984 | Schetter | 74/333 |
| 4,553,623 | 11/1985 | Ohkubo | 180/247 |
| 4,561,520 | 12/1985 | Fogelberg | 180/247 |
| 4,586,592 | 5/1986 | Mori | 74/665 T |

Primary Examiner—Leslie Braum
Assistant Examiner—David Novais
Attorney, Agent, or Firm—Armstrong, Nikaido, Marmelstein & Kubovcik

[57] ABSTRACT

A power change-over mechanism of a vehicle for industrial machinery including a spool divided into two members: an outer peripheral side member having splines freely meshed with splines of high-speed and low-speed gears and an inner peripheral side member having a spline freely meshed with splines of first and second driving shafts, an inner peripheral sub-spline constantly meshing with the first driving shaft being further formed on the outer peripheral side member, the outer peripheral side member being clearance fitted onto an outer periphery of the inner peripheral side member, and the inner and outer peripheral side members being connected relatively movable with respect to each other in the axial direction through a damper means.

1 Claim, 4 Drawing Figures

POWER CHANGE-OVER MECHANISM OF A VEHICLE FOR INDUSTRIAL MACHINERY

This is a division of application Ser. No. 714,749, filed Mar. 22, 1985, now U.S. Pat. No. 4,677,867.

BACKGROUND OF THE INVENTION

1. Field of Industrial Usefulness

This invention relates to a power change-over mechanism of a vehicle for industrial machinery, which permits free change-over between four-wheel drive and two-wheel drive.

2. Prior Art

In FIG. 1 showing a conventional embodiment, a first driving shaft 1 for driving a rear wheel and a second driving shaft 2 for driving a front wheel are both aligned on the same axis center, and at the same time they have outward splines 3, 4 respectively. A high-speed gear 5 and a low-speed gear 6 fit onto the first and second driving shafts 1, 2 through bearings 7, 7a, and at the same time they have inward splines 8, 9 respectively. An annular power change-over spool (spline joint) 10 has an inward spline 11 and a pair of outward splines 13, 14 and at the same time it provides an annular groove 16 for engagement with a shift fork and spline fits onto the first driving shaft 1 freely slidingly operably in the axial direction.

In case of the four-wheel drive, the spool 10 is shifted forward to interconnect the low-speed gear 6 through the spool 10 to the first and second shafts, 1, 2. Namely, a power transmitted from an engine through a transmission to the low-speed gear 6 is transmitted through the splines 9, 14 to the spool 10, and further transmitted from the spool 10 to the first driving shaft 1 through means of the splines 11, 3 and to the second driving shaft 2 through means of the splines 11, 4.

In case of the two-wheel, the spool 10 is shifted rearward to interconnect the high-speed gear 5 through the spool 10 to the first driving shaft 1. Namely, the power transmitted from the engine through the transmission to the high-speed gear 5 is transmitted through the splines 8, 13 to the spool 10, and further transmitted from the spool 10 to the first driving shaft 1 through means of the splines 11, 3 to drive the rear wheel.

However, in case when the power change-over mechanism is composed of the power change-over annular spool 10 as a member, the following disadvantages will arise at the time of change-over. Generally, in case of power change-over, a power from an engine has previously been cut off by means of a clutch etc. and the change-over operation is done with a vehicle stopped. However, in case of change-over from the two-wheel drive to the four-wheel drive, meshing of gears is under fixed condition because of the driving shaft 1 being interconnected to the rear wheel and the driving shaft 2 being interconnected to the front wheel, so that the spline 11 of the spool 10 would not mesh with spline 4 of the driving shaft 2 to make the change-over from the two-wheel drive into the four-wheel drive impossible.

Further, under a normal four-wheel drive operation, a torsion will be produced between the driving shafts 1, 2 due to slippage of wheel and large contact forces will be generated between the spline 3 of the driving shaft 1 and the spline 11 of the spool 10 and between the spline 4 of the driving shaft 2 and the spline 12 of the spool 10, so that the spool 10 would not slide to make the change-over from the four-wheel drive into the two-wheel drive impossible. For this reason, a change-over from a high-speed into a low-speed or a change-over from a low-speed into a high-speed will naturally become impossible.

The applicant of this invention proposed in the application (Japan Ser. No. S58-108286; U.S. Ser. No. 621,318 now U.S. Pat. No. 4,553,623), as a means to improved the above disadvantage, the means in which the change-over spool was divided into two: the outer peripheral side member and the inner peripheral side member, and the both members were spline fitted axially slidingly each other through the damper. However, the phenomenon of change-over from the four-wheel drive to the two-wheel drive being impossible was not completely dissolved because a power was directly transmitted between the outer peripheral side member and the inner peripheral side member when they were spline connected.

3. Object of the Invention

An object of this invention is to enable the disadvantage of the conventional embodiment shown in FIG. 1 to be more perfectly dissolved by improving said mechanism of application No. S58-108286, i.e. to simple and securely enable the change-over between four-wheel drive and two-wheel drive and the change-over between high-speed and low-speed by operating one set of spool only once even under a condition where the driving shafts of front and rear wheels do not mesh each other due to deviation of spline phase thereof, or under a condition where a torsion is produced between the driving shafts of the front and rear wheels.

In order to accomplish the above object, in a power change-over mechanism of this invention, a spool is divided into two; an outer peripheral side member having splines freely meshed with splines of high-speed and low-speed gears and an inner peripheral side member having a spline freely meshed with splines of said driving shafts, an inner peripheral sub-spline constantly meshing with the first driving shaft is further formed on the outer peripheral member, the outer peripheral member is clearance fitted onto an outer periphery of the inner peripheral member, and the outer and inner peripheral members are relatively movably connected in the axial direction through a damper means.

DETAILED DESCRIPTION OF THE INVENTION

Embodiment 1

Figure 1:
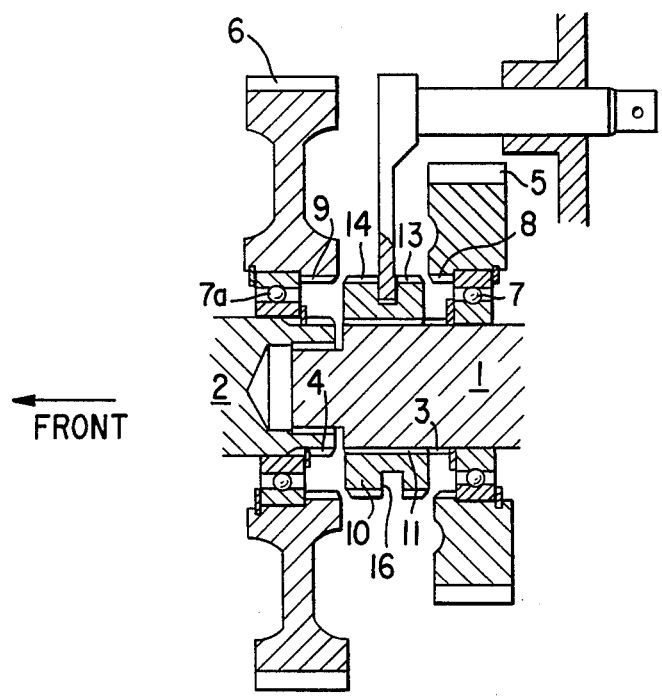
FIG. 1 is a vertical sectional view of a conventional embodiment.
Figure 2:
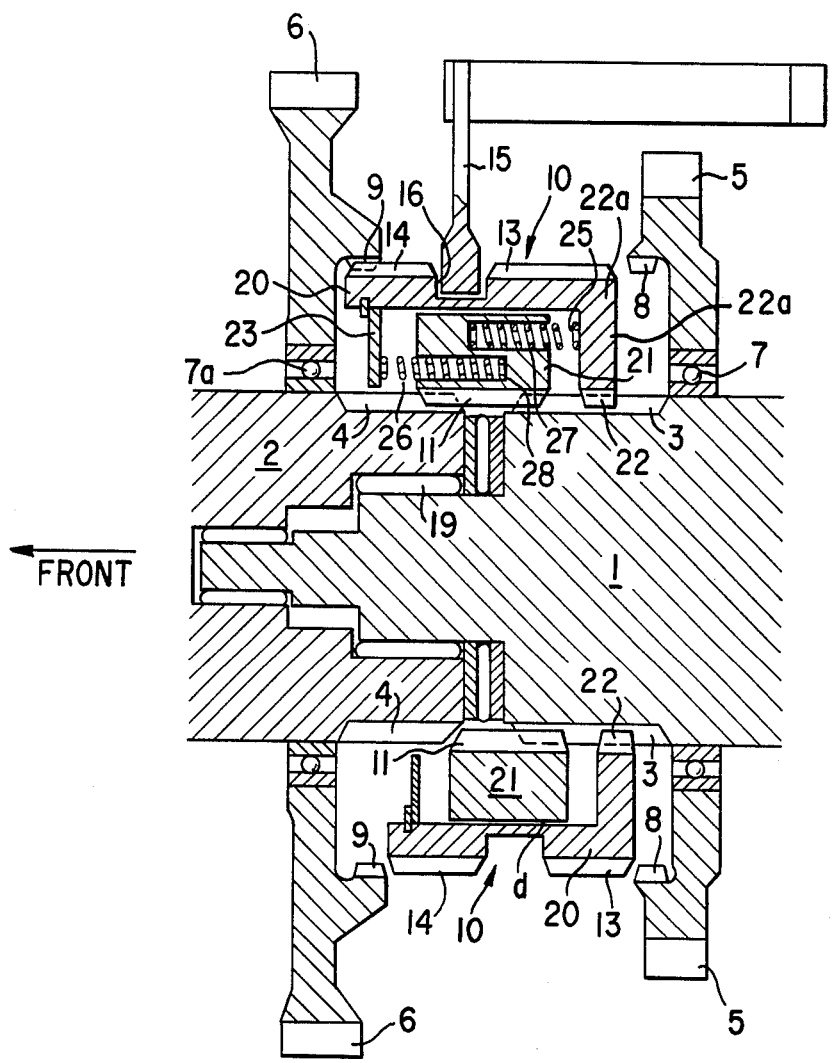
FIG. 2 is a vertical sectional view of a first embodiment of this invention.

FIG. 2 is the vertical sectional view of the first embodiment an upper half of which shows a four-wheel drive state and a lower half of which shows a neutral state, and a component corresponding to that of FIG. 1 is attached with the same number as FIG. 1. In this FIG. 2, first and second driving shafts 1, 2 are aligned on the same axis center through an aligning bearing metal 19, the first driving shaft 1 is interconnected, for example, to a rear wheel at a rear side and the second drive shaft 2 is interconnected to a front wheel at a front side. A high-speed gear 5 fits freely rotatably onto the first driving shaft 1 through a bearing 7, a low-speed gear 6 fits freely rotatably onto the second driving shaft 2 through a bearing 7a, the both gears 5, 6 mesh with appropriate gears of a transmission (not shown) respectively, thus a power being transmitted from an engine through a clutch etc. Naturally, the high-speed gear 5 rotates at a higher speed than that of the low-speed gear 6.

Outward splines 3, 4 are formed on the first and second driving shafts 1, 2 respectively, and inward splines 8, 9 are formed on bosses of the both gears 5, 6 respectively. The spline 8 of the high-speed gear 5 faces at the spline 3 of the first driving shaft 1 with a space left therebetween and the spline 9 of the low-speed gear 6 faces at the spline 4 of the second driving shaft 2 with a space left therebetween.

A power change-over annular spool (spline joint) 10 disposed between the both gears 5, 6 is divided into two; an outer peripheral side member 20 and an inner peripheral side member 21, and the outer peripheral side member 20 fits onto an outer periphery of the inner peripheral side member 21 axially movably each other and with an annular clearance d provided therebetween. Namely, the spool is so deviced that a power is not transmitted directly from the outer peripheral side member 20 to the inner peripheral side member 21.

Splines 13, 14 freely meshed with the splines 8, 9 of the gears 5, 6 are formed on an outer peripheral surface of the outer peripheral side member 20, and an inner peripheral sub-spline 22 constantly meshing with the spline 3 of the first driving shaft 1 is formed at a rear end portion of the outer peripheral side member 20. An annular spring washer 23 fits in an inner peripheral side of a front end portion of the outer peripheral side member 20, and is stopped by a snap ring. An annular groove 16 is formed on an outer periphery of the outer peripheral side member 20, and a shift fork 15 engages with the annular groove 16.

The inner peripheral side member 21 is disposed at an axially central part between the sub-spline 22 and the spring washer 23. A spline 11 constantly meshing with the spline 3 of the first driving shaft 1 is formed on an inner peripheral surface of the inner peripheral side member 21, and this spline 11 is freely meshed with the spline 4 of the second driving shaft 2.

A first coil spring 25 urging the inner peripheral side member 21 forward relatively to the outer peripheral side member 20 and a second coil spring 26 urging the inner peripheral side member backward relatively thereto are provided as a damper means. Namely, an opened-backward first spring receiving recession 27 and an opened-forward second spring receiving recession 28 are formed on the inner peripheral side member 21, the first spring 25 is inserted projectingly backward into the first spring receiving recession 27, and the second spring 26 is inserted projectingly forward into the second spring receiving recession 28. A rear end of the first spring 25 presses on a front face of a barrel 22a of the sub-spline 22, and a front end of the second spring 26 presses on a rear face of the washer 23. The inner peripheral side member 21 is held at anaxially central position between the washer 23 and the sub-spline 22. Incidentally, the first spring 25 is disposed, for example, on three places spaced equally in the circumferential direction, and the second spring 26 is also disposed on three places.

Function of the Invention

As illustrated in the upper half of FIG. 2, when the entire spool 10 is moved toward the front side, the front side spline 14 of the outer peripheral side member 20 fits into the spline 9 of the low-speed gear 6 and at the same time the spline 11 of the inner peripheral side member 21 fits onto the spline 4 of the second driving shaft 2, thus a low-speed four-wheel drive state is created. A power transmitting path at this moment is explained as follows: A power is transmitted from the low-speed gear 6 through the splines 9 and 14, the outer peripheral side member 20 and the splines 22 and 3 to the first driving shaft 1. Further, the power is transmitted from the first driving shaft 1 through the splines 3 and 11, the inner peripheral side member 21 and the splines 11 and 4 to the second driving shaft 2, thereby the both shafts 1, 2 rotate at a low speed.

When the entire spool 10 is moved from its neutral position as shown by the lower half of FIG. 2 to the rear side, the rear side outer peripheral spline 13 of the outer peripheral side member 20 fits into the spline 8 of the high-speed gear 5, the spline 11 of the inner peripheral side member 21 disengages from the spline 4 of the second driving shaft 2, thus a high-speed two-wheel drive state in which only the first driving shaft 1 is rotating is created. A power transmitting path at this moment is explained as follows: A power is transmitted from the high-speed gear 5 through the splines 8 and 13, the outer peripheral side member 20 and the splines 22 and 3 to the first driving shaft 1 only.

In case of stopping under the two-wheel drive state, when a phase difference is produced between the spline 11 of the spool 10 and the spline 4 of the second driving shaft 2, change-over from the two-wheel drive to the four-wheel drive is performed as follows: When the spool 10 is moved forward from the neutral position shown by the lower half of FIG. 2, the spline 14 of the outer peripheral side member 20 fits into the spline 9 of the low-speed gear 6, but the spline 11 of the inner peripheral side member 21 only contacts with a rear end of the spline 4 of the driving shaft 2 but does not fit with it, thereby the first spring becomes compressed.

However, at the moment when phases of the both splines 4 and 11 coinside after a vehicle starts moving, the spline 11 of the inner peripheral side member 21 is engaged with the spline 4 of the driving shaft 2 by an elastic force (restoring force) of the first spring 25, thus the four-wheel drive state is automatically created.

In case of stopping under the four-wheel drive state when a torsion is produced between the driving shafts 1 and 2 due to slippage of wheel etc. to cause a large pressing force between the spline 3 of the first driving shaft 1 and the spline 11 of the spool 10 or a large pressing force between the spline 4 of the second driving shaft 2 and the spline 11 of the spool 10, change-over from the four-wheel drive to the two-wheel drive is performed as follows: When the driving mode is changed from the low-speed four-wheel drive position (the position shown by the upper half of FIG. 2) to the high-speed two-wheel drive position in case of a torsion produced between the driving shafts 1 and 2, only the outer peripheral side member 20 moves backward against the second spring to create the high-speed four-wheel drive first of all. In this instance the inner peripheral side member 21 is locked by the splines 3, 4 of the both shafts 1, 2, however, no torque is transmitted directly between the both members 20, 21 because the outer peripheral side member 20 is clearance fitted onto the inner peripheral side member 21, so that the outer peripheral side member 20 can be moved smoothly backward in relation to the inner peripheral side member 21. And, at the moment when a vehicle load of the second driving shaft 2 side instantaneously becomes zero after the vehicle starts running from the instantaneous high-speed four-wheel drive state, the inner peripheral side member 21 is moved backward by an elastic force of the second spring 26, thus the driving mode is automatically changed to the high-speed two-wheel drive state.

Embodiment 2

Figure 3:
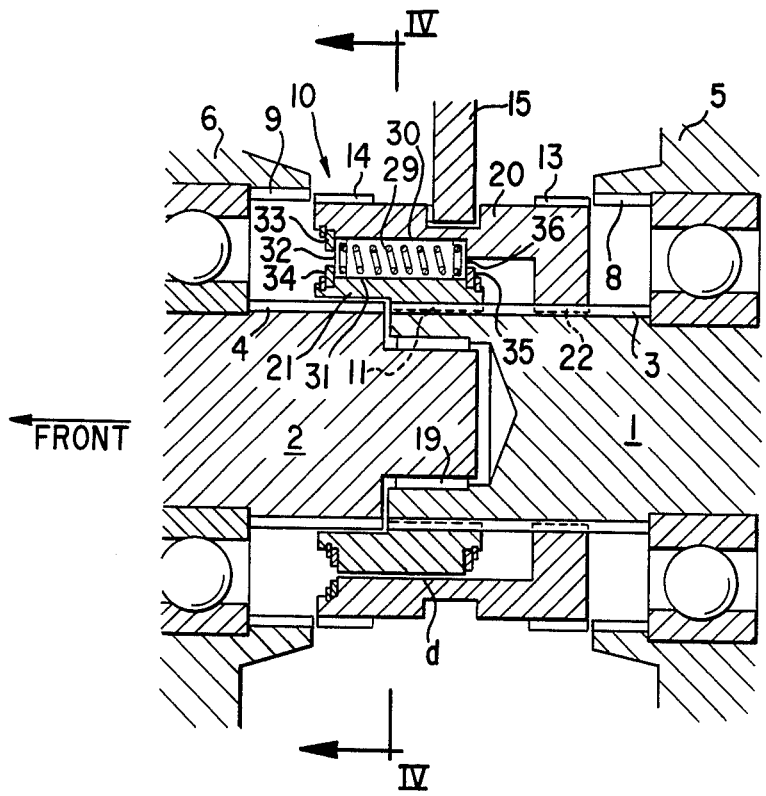
FIG. 3 is a vertical sectional view of a second embodiment of this invention.

FIG. 3 shows an embodiment using one kind of coil spring 29 as the damper means. Namely, in FIG. 3, a spring receiving notch 30 is formed on an inner peripheral surface of the outer peripheral side member 20, a spring receiving notch 31 corresponding to said notch 30 is formed on an outer peripheral surface of the inner peripheral side member 21, and the spring 29 is compressedly installed in a cylindrical space formed by the both notches 30, 31 expansively in its axial direction. A front end of the spring 29 is stopped by large-dia. and small-dia. annular holding plates 33, 34 through a spring washer 32, and a rear end of the spring 29 is stopped by a small dia. annular holding plate 35 and a shouldered part of the outer peripheral side member 20 through a spring washer 36. The large-dia. holding plate 33 is fixed axially immovably to an inner peripheral surface of the outer peripheral side member 20 by means of a snap ring etc., and the small-dia. holding plates 34, 35 are fixed axially immovably to an outer peripheral surface of the inner peripheral side member 21 by means of a snap ring. The spring 29 is provided, for example, at four places equally spaced in the circumferential direction as shown by FIG. 4 for example.

Incidentally, the spring washers 32, 36 are disposed in the notches 30, 31 with circumferential plays provided between them, thereby the outer peripheral side member 20 can be slightly rotated relatively to the inner peripheral side member 21.

Figure 4:
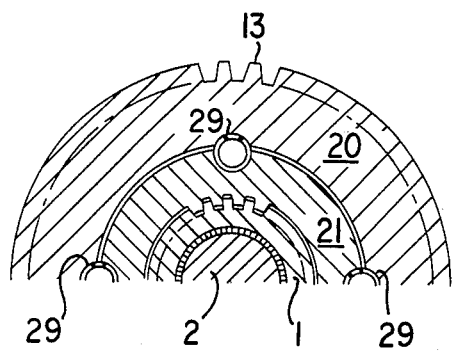
FIG. 4 is a sectional view taken on a line IV—IV of FIG. 3.

In FIG. 3 and FIG. 4, a component corresponding to that of FIG. 2 is attached with same member as FIG. 2.

Function of Invention

Samely with the case of said first embodiment, the spring 29 is compressed when the outer peripheral side member 20 moves in either forward or backward direction relatively to the inner peripheral side member 21. Namely, the spring 29 is adapted to serve as both the first and second springs 25, 26 of FIG. 2.

Another Embodiment (1) The first and second springs 25, 26 of FIG. 2 may be disposed atternatively each other in the circumferential direction without aligning them on the same radial line.

(2) The first driving shaft may be used for driving a front wheel and the second driving shaft may be used for driving a rear wheel. Namely, a two-front-wheel drive may be employed.

(3) A rubber-type elastic body or an air-spring may be used as the damper means.

Effect of the Invention

The annular power change-over spool 10 is divided into two: the outer peripheral side member 20 having the splines 13, 14 freely meshed with the splines 8, 9 of the high-speed gear 5 and the low-speed gear 6 and the inner peripheral side member 21 having the spline 11 freely meshed with the splines 3, 4 of the first and second driving shafts 1, 2; the outer peripheral side member 20 is clearance fitted onto the inner peripheral side member 21; the sub-spline 22 constantly meshing with the spline 3 of the first driving shaft 1 is formed on the outer peripheral side member 20; and the both members 20, 21 are adapted to be relatively movable each other in the axial direction through the damper means; so that the following effects are obtainable.

(1) Even when the vehicle is stopping under the condition where the splines 3, 4 of the driving shafts 1, 2 for front and rear wheels do not mesh each other through the spool 10 due to the phase difference produced therebetween or under the condition where the load is applied, the only one-time operation of the spool 10 surely enables the change-over between high-speed and low-speed when the vehicle is stopping, and automatically enables the change-over between two-wheel drive and four-wheel drive by the restoring force of the damper means when the vehicle starts moving. Namely, the change-over operation by the spool 10 can be simply and surely performed and the troubles such as the change-over becoming impossible, the gear noise etc. can be dissolved.

(2) The power is not directly transmitted between the both members 20, 21 by clearance fitting the outer peripheral side member 20 onto the inner peripheral side member 21, so that the outer peripheral side member 20 can be moved always smoothly in the axial direction relatively to the inner peripheral side member 21. Namely, the troubles such as the change-over being impossible etc. can be dissolved much more surely.

(3) The change-overs between high-speed and low-speed and between two-wheel drive and four-wheel drive become possible by connecting, for example, one shift fork 15 to the spool 10 assembled as one unit, so that a volume of the mechanism can be minimized and its manufacturing cost can be decreased.

What is claimed is:

1. A power change-over mechanism of a vehicle for industrial machinery comprising:
   a. a first driving shaft and a high-speed gear mounted for rotation thereon;
   b. a second driving shaft disposed in coaxial arrangement with said first driving shaft and having a low speed gear mounted for rotation thereon;
   c. splines formed in both said shafts and both said gears;
   d. a power change-over annular spool disposed between said gears freely slidingly operable in an axial direction from a two-wheel drive position to a four-wheel drive position;
   e. said spool being divided into two members; an outer peripheral member having a cylindrical portion with exterior splines for freely meshing with said gears and a radially inwardly extending flange at one end of said cylindrical portion with an interior sub-spline constantly meshing with the spline of the first driving shaft and adapted for axial movement between said two-wheel drive position and said four-wheel drive position;
   f. said outer peripheral member being disposed around an internal peripheral side member with an annular clearance between said members;

g. said outer peripheral member also having an annular member on its inner peripheral surface held against axial movement to prevent said member from moving in a direction away from said flange portion; and
h. said inner and outer peripheral member being movably connected to each other in the axial direction through a damper means;
i. wherein said damper means comprises plural spring receiving notches formed on an inner peripheral surface of the outer peripheral side member and an outer peripheral surface of the inner peripheral surface respectively, springs are disposed as the damper in cylindrical spaces formed by both notches, the springs making contact at one end with annular members secured to the outer and inner peripheral side members and at their other ends with an annular member secured to said inner peripheral side member and a flange of said outer peripheral side member.

* * * * *